United States Patent
Bezerra Maimoni et al.

(10) Patent No.: US 11,307,940 B2
(45) Date of Patent: Apr. 19, 2022

(54) COGNITIVE DATA BACKUP

(71) Applicant: KYNDRYL, INC., New York, NY (US)

(72) Inventors: Ana Maria Bezerra Maimoni, Sao Paulo (BR); Gavin Charles O'Reilly, Kilcoole (IE); Clea Anne Zolotow, Key West, FL (US); Marci Devorah Formato, Clintondale, NY (US); Jack Louis Cherkas, London (GB)

(73) Assignee: Kyndryl, Inc., New York, NY (US)

( * ) Notice: Subject to any disclaimer, the term of this patent is extended or adjusted under 35 U.S.C. 154(b) by 413 days.

(21) Appl. No.: 16/539,320

(22) Filed: Aug. 13, 2019

(65) Prior Publication Data
US 2021/0049074 A1 Feb. 18, 2021

(51) Int. Cl.
*A61N 1/00* (2006.01)
*G06F 11/14* (2006.01)
*G06N 20/00* (2019.01)

(52) U.S. Cl.
CPC ...... *G06F 11/1461* (2013.01); *G06F 11/1464* (2013.01); *G06N 20/00* (2019.01); *G06F 2201/80* (2013.01)

(58) Field of Classification Search
CPC ............. G06F 11/1461; G06F 11/1464; G06F 2201/80; G06N 20/00
USPC .................................................. 707/600–899
See application file for complete search history.

(56) References Cited

U.S. PATENT DOCUMENTS

| | | | |
|---|---|---|---|
| 7,065,616 B2 | 6/2006 | Gajjar | |
| 7,519,624 B2 | 4/2009 | Korupolu | |
| 8,762,341 B1 | 6/2014 | Mahajan | |
| 9,632,875 B2 | 4/2017 | Raichstein | |
| 9,720,783 B1 | 8/2017 | Kulkarni | |

(Continued)

FOREIGN PATENT DOCUMENTS

WO   201618449 A1   2/2016

OTHER PUBLICATIONS

"Method and System and method to automatically suggests when it's time to backup critical data", An IP.com Prior Art Database Technical Disclosure, Disclosed Anonymously, IP.com No. IPCOM000254466D, IP.com Electronic Publication Date: Jul. 2, 2018, 3 pages, <https://priorart.ip.com/IPCOM/000254466>.

(Continued)

*Primary Examiner* — Isaac M Woo
(74) *Attorney, Agent, or Firm* — Ken Han; Matthew M. Hullhan; Heslin Rothenberg Farley & Mesiti PC

(57) ABSTRACT

A method, system and computer program product for data backup based on a workload behavior includes a first computer identifying, using machine learning tools, data associated with frequently accessed files on the first computer by a workload being processed by a second computer. The first computer processes the identified data associated with the frequently accessed files to generate a list of frequently accessed files by the workload, and compares the list of frequently accessed files to backup policy rules active on the first computer. Based on the comparison, the first computer identifies a mismatch between the list of frequently accessed files and the backup policy rules, and specifies a new backup rule to update the backup policy rules for each identified mismatch between the list of frequently accessed files and the backup policy rules.

18 Claims, 7 Drawing Sheets

(56) References Cited

U.S. PATENT DOCUMENTS

| | | |
|---|---|---|
| 10,133,644 B2 | 11/2018 | Biermayr |
| 2005/0091266 A1 | 4/2005 | Hasegawa |
| 2015/0370645 A1 | 12/2015 | Dhanalakoti |
| 2020/0042398 A1* | 2/2020 | Martynov ............. G06F 3/0605 |

OTHER PUBLICATIONS

"Method of files mapping to LUN and their respective backups & snapshots", An IP.com Prior Art Database Technical Disclosure, Disclosed Anonymously, IP.com No. IPCOM000256459D, IP.com Electronic Publication Date Dec. 1, 2018, 6 pages, <https://priorart.ip.com/IPCOM/000256459>.

"Veritas NetBackup™ for Microsoft SQL Server Administrator's Guide for Windows", Veritas, Release 8.1, Last updated: Sep. 25, 2017, pp. 1-275, <https://www.veritas.com/support/en_US/doc/17221771-126559330-0/v99951767-126559330>.

Mell et al., "The NIST Definition of Cloud Computing", National Institute of Standards and Technology, Special Publication 800-145, Sep. 2011, 7 pages.

Toigo, Jon, "Automated data management is a crucial part of IT's future", Searchstorage, TechTarget, last published in Nov. 2018, 3 pages, <https://searchstorage.techtarget.com/opinion/Automated-data-management-is-a-crucial-part-of-ITs-future>.

Toigo, Jon, "Focus attention on a cognitive data management system", Searchstorage, TechTarget, last published Dec. 2016, 4 pages, <https://searchstorage.techtarget.com/opinion/Focus-attention-on-a-cognitive-data-management-system>.

* cited by examiner

COGNITIVE DATA BACKUP

BACKGROUND

The present invention generally relates to the field of data storage, and more particularly to a system, method and computer program product for cognitive backup of computer data.

Data is typically stored on computing systems and/or attached storage devices. The data may include operating system data, file system data, and application data. Data may be lost due to system failure or human error. Frequently, a backup copy of data is made to enable a data restore from the backup copy if the primary copy data is lost, corrupted or becomes inconsistent. Typically, the backup utility of current computing systems operates according to a policy-based management system that includes a number of operating rules based on which data is transferred to storage devices during backup operations. However, in some cases, data can be loss during the backup operations due to inaccurate include/exclude lists, finger checks, incorrect or outdated filename lists, or other reasons. This can negatively impact the backup of important and/or frequently accessed files. Thus, there can be a need for data backup operations alternative to those of existing policy-based management systems.

SUMMARY

An embodiment of the present disclosure provides a method for data backup based on a workload behavior, the method includes identifying by a first computer, using machine learning tools, data associated with frequently accessed files on the first computer by a workload being processed by a second computer, processing, by the first computer, the identified data associated with the frequently accessed files to generate a list of frequently accessed files by the workload, comparing, by the first computer, the list of frequently accessed files to backup policy rules active on the first computer, based on the comparison, identifying, by the first computer, a mismatch between the list of frequently accessed files and the backup policy rules, and for each identified mismatch between the list of frequently accessed files and the backup policy rules, specifying, by the first computer, a new backup rule to update the backup policy rules.

Another embodiment of the present disclosure provides a computer program product for data backup based on a workload behavior, based on the method described above.

Another embodiment of the present disclosure provides a computer system for data backup based on a workload behavior, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
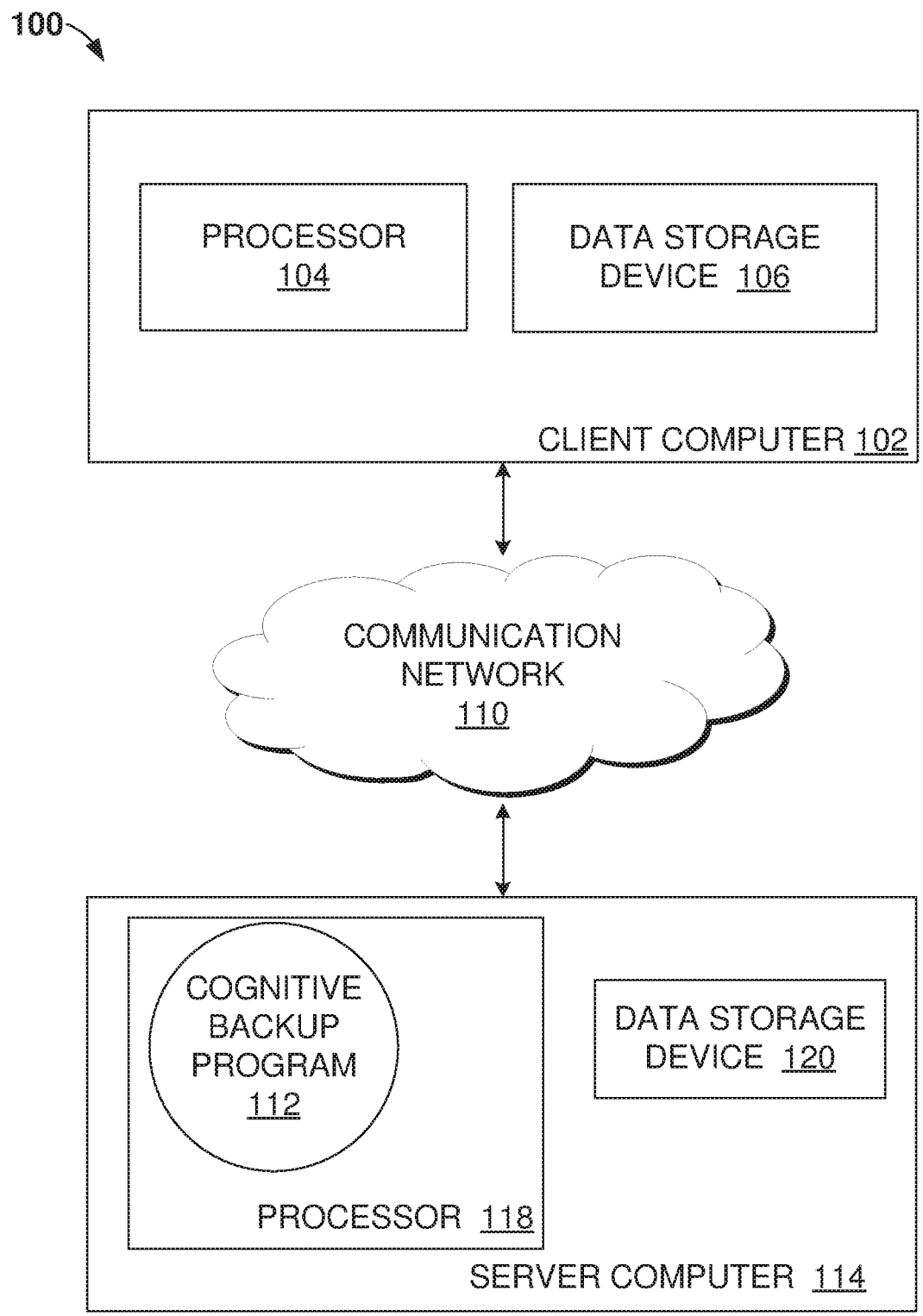
FIG. 1 is a block diagram illustrating a networked computer environment, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In information technology (IT), the process of backing up computer data refers to copying, via an executable backup program, data from a first repository to a second repository for a variety of purposes. One purpose for backing up data is to enable data recovery from the second repository in the event of data loss in the first repository. Data loss can occur via data deletion, data corruption, or the destruction of data bearing computer readable storage media as a result of human actions and/or natural disasters. Another purpose for backing up data is to recover previous versions of files, computer programs, operating systems, and the like. In general, the second repository (i.e., a backup system) can include one or more types of computer readable storage media on which backups are stored. For example, magnetic tape, hard disk(s), optical storage device(s), solid-state storage media can be used alone or in any combination as part of a backup system. Additionally, the second repository can be an on-line repository, a near-line repository, or an off-line repository based on various redundancy, security, and/or accessibility requirements.

Typically, executable backup programs run and end with a successful condition code of 0, that indicates the data has been stored in an answer area provided by the calling backup program. However, in some cases, frequently accessed files, for which backup is essential, are not included in the backup process due to inaccurate include/exclude lists, finger checks, incorrect or outdated filename lists, or other reasons. This can be avoided by selecting the data to be backup based on file access statistics obtained from hardware components, operating system and databases, thereby guaranteeing the backup of frequently accessed or important files.

Embodiments of the present invention generally relates to the field of data storage, and more particularly to a system, method and computer program product for cognitive backup of computer data. The following described exemplary embodiments provide a system, method, and computer program product to, among other things, combine data from machine learning tools and policy data to ensure backup of heavily used files is successfully performed. Therefore, the present embodiments have the capacity to improve the technical field of data storage by effectively moving the backup utility of a computer system from a policy-based management system (i.e., all files including *.PROD.*) to a behavior-based management system (i.e., all files accessed by at least 50 transactions per day, or all files with accumulated Input/Output Operations Per Second (IOPS)>x). By doing this, data backup(s) are guaranteed to be performed and not just marked with a complete (or not complete) status due to syntax or other errors.

Referring now to FIG. 1, an exemplary networked computer environment 100 is depicted, according to an embodiment of the present disclosure. The networked computer environment 100 may include a client computer 102 with a processor 104 and a data storage device 106. The networked computer environment 100 may also include a server computer 114 with a processor 118 and a data storage device 120 and a communication network 110. The networked computer environment 100 may include a plurality of client computers 102 and server computers 114, only one of which is shown. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with a cognitive backup program 112 running on server computer 114 via the communications network 110. The communication network 110 may be a local area network (LAN), a wide area network (WAN), such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. Communication network 110 may include wired, wireless or fiber optic connections. As known by those skilled in the art, the networked computer environment 100 may include additional computing devices, servers or other devices not shown.

As will be discussed with reference to FIG. 4, server computer 114 and client computer 102 may include a plurality of internal and external components. Client computer 102 may be, for example, a mobile device, a telephone (including smartphones), a personal digital assistant, a netbook, a laptop computer, a tablet computer, a desktop computer, or any type of computing devices capable of accessing a network, including Internet of Things (IoT) devices. An IoT refers to an overall infrastructure (hardware, software, and services) supporting the seamless integration of physical things (e.g., everyday objects) into information networks. In some embodiments, server computer 114 may be a management server, a web server or any other electronic device capable of receiving and sending data. In other embodiments, server computer 114 may represent a server computing system utilizing multiple computers as a server system, such as in a cloud computing environment.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2:
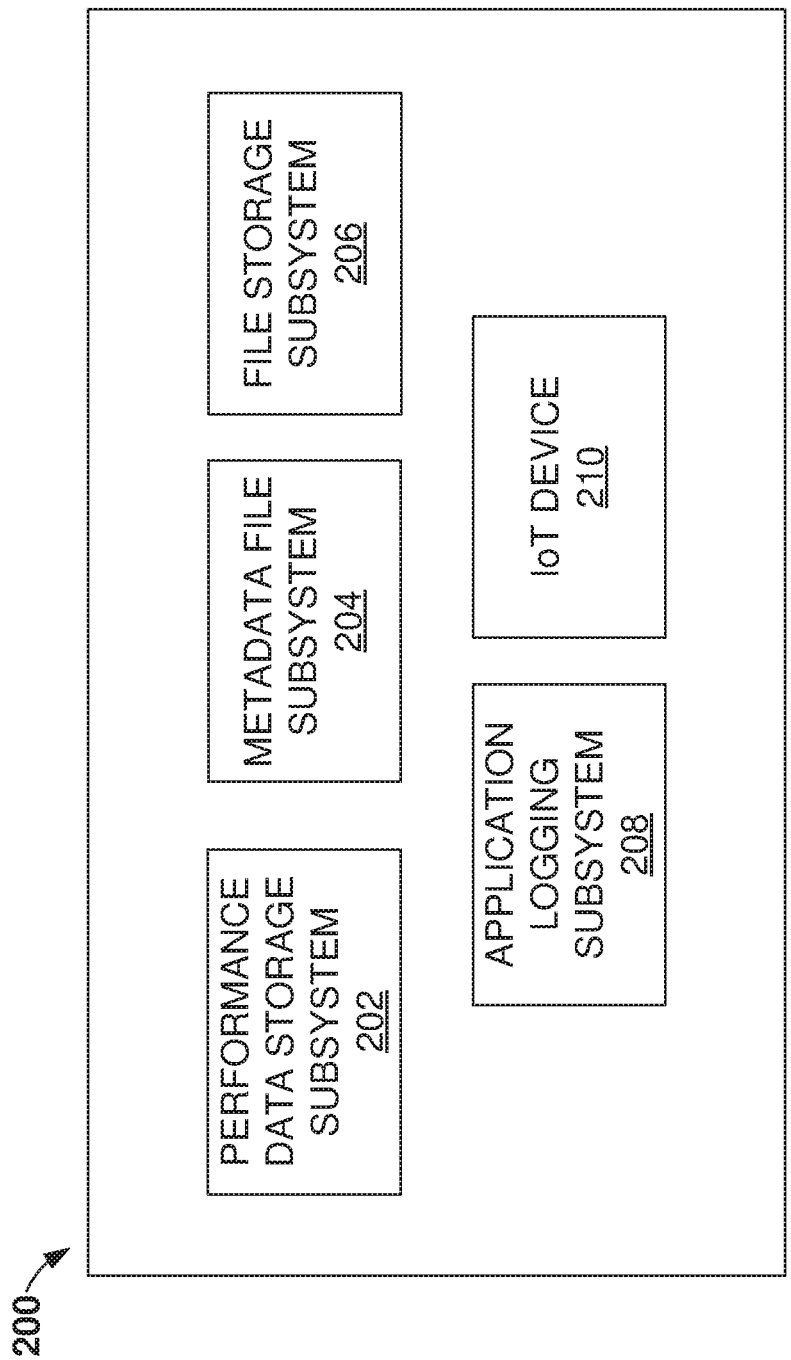
FIG. 2 is an exemplary block diagram depicting components of a system for cognitive backup of computer data, according to an embodiment of the present disclosure.

Referring now to FIG. 2, an exemplary block diagram 200 depicting components of a system for cognitive backup of computer data is shown, according to an embodiment of the present disclosure. Specifically, the system components of FIG. 2 provides a way of determining a workload behavior and, based on such behavior, identifying data associated with frequently accessed files by the workload being processed. In this embodiment, the proposed system for cognitive backup of computer data includes a performance data storage subsystem 202, a metadata file subsystem 204, a file storage subsystem 206, an application logging subsystem 208, and an IoT device 210.

The performance data storage subsystem 202 collects performance data associated with performance characteristics of block storage device logical volumes (also referred to as "storage volumes"), typically presented over a SAN fabric using Internet Small Computer Systems Interface (iSCSI) or fiber channel(s). The performance data indicates an activity level corresponding to a plurality of applications (hereinafter "applications") reading and/or writing data to the storage volumes. As may be known by those skilled in the art, performance data can be obtained by measuring, using statistics tools, key performance indicators that provide the necessary information to make management decisions about improvements, adjustments or modifications to current processes and systems.

According to an embodiment, the performance data storage subsystem 202 acts as a repository for information that is collected about the workload behavior, particularly regarding the workload access to system files. The term "workload" generally refers to an amount of processing that a computer has been given to do at a given time. In some instances, the workload may consist of some amount of applications running in the computer and some number of users connected to and interacting with the computer's applications.

The performance data storage subsystem 202 can collect statistics about most frequently accessed files by the workload using a database management tool. For example, in some embodiments, the performance data storage subsystem 202 captures performance data to a first database management tool such as IBM® Spectrum Control™ or IBM® Spectrum Discover™. IBM® Spectrum Control™ and IBM® Spectrum Discover™ are registered trademarks of International Business Machines Corporation, Armonk, N.Y., US.

It should be noted that any workload data collection is done with a user consent via, for example, an opt-in and opt-out feature. As known by those skilled in the art, an opt-in and opt-out feature generally relates to methods by which the user can modify a participating status (i.e., accept or reject the data collection). In some embodiments, the opt-in and opt-out feature can include available software application(s). User(s) can stop the data collection at any time. In some embodiments, user(s) can be notified each time data is being collected. The collected data is envisioned to be secured and not shared with anyone without consent.

The metadata file subsystem 204 creates timestamps for each (frequently accessed) file identified by the performance data storage subsystem 202. According to an embodiment, the metadata file subsystem 204 has, in each server instance, a file system storage (not shown) for application data. A time at which a file was last modified can be stored as a timestamp of the file. The file system storage can store a file creation time, a time the file was last accessed, a time file metadata was changed, or a time the file was last backed up. Collecting this data allows for it to be compared to or cross checked against the current backup policy rules. Stated differently, the metadata file subsystem 204 creates timestamps identifying last accessed, last read, and/or last changed file(s).

The file storage subsystem 206 collects data associated with performance characteristics of (file) storage volumes typically presented over a network (e.g., communication network 110 in FIG. 1) using Network File System (NFS) or Server Message Block (SMB) protocols. According to an embodiment, the file storage subsystem 206 captures time-stamped data to a second database management tool such as, for example, Arxscan®.

The application logging subsystem 208 provides a transaction log including a file containing a record of communications (i.e., transactions) between a system and its users. In some embodiments, the application logging subsystem 208 may include a data collection functionality that automatically captures a type, content, or time of transactions made by a user from a terminal with that system. In an exemplary embodiment, the application logging subsystem 208 captures data locally to a database log file such as the database log file of the IoT device 210. The captured data may include event logs or syslog collection associated with user's activity on the IoT device 210.

Figure 3A:
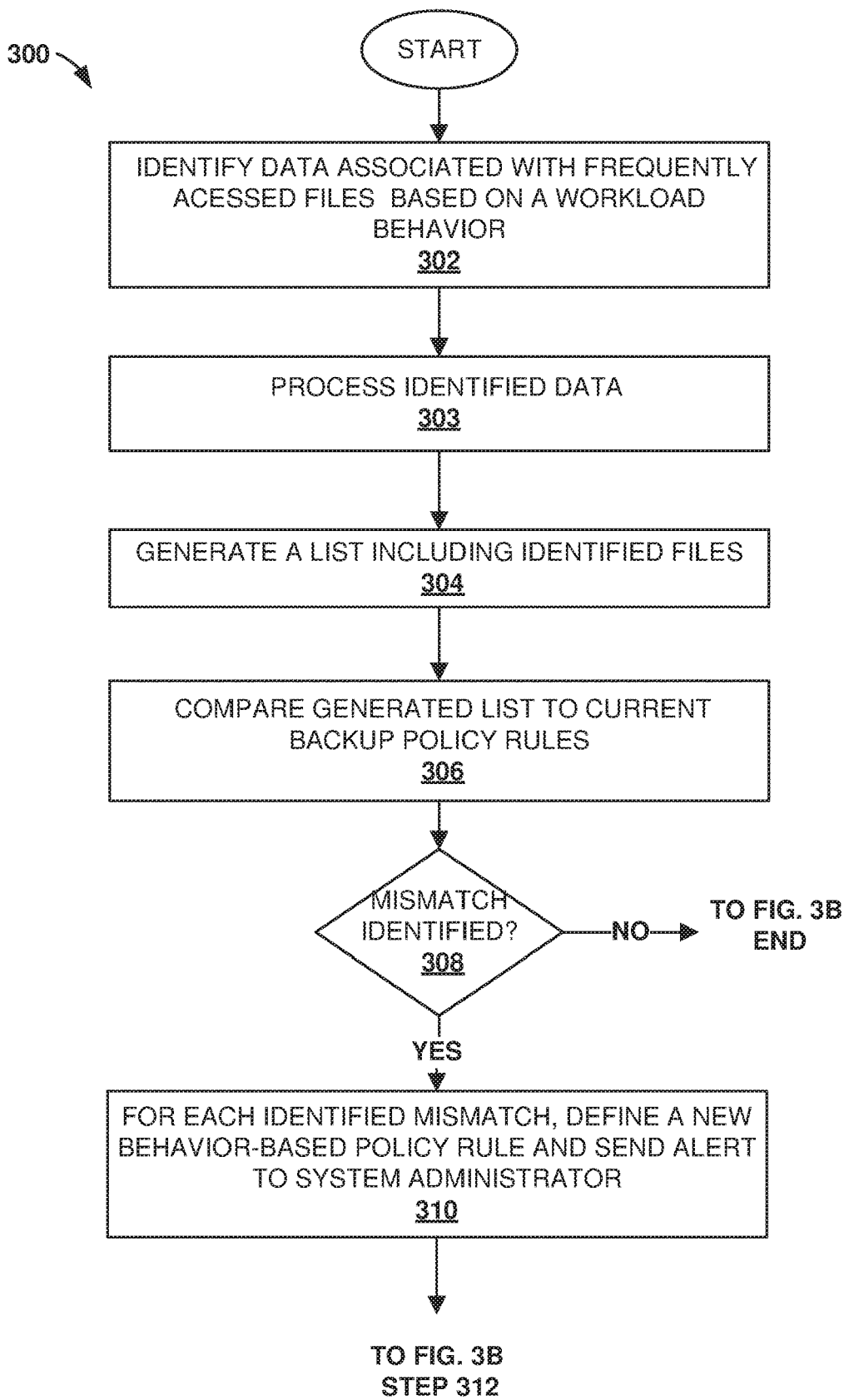
FIGS. 3A and 3B are flowcharts illustrating a method for cognitive backup of computer data, according to an embodiment of the present disclosure.
Figure 3B:
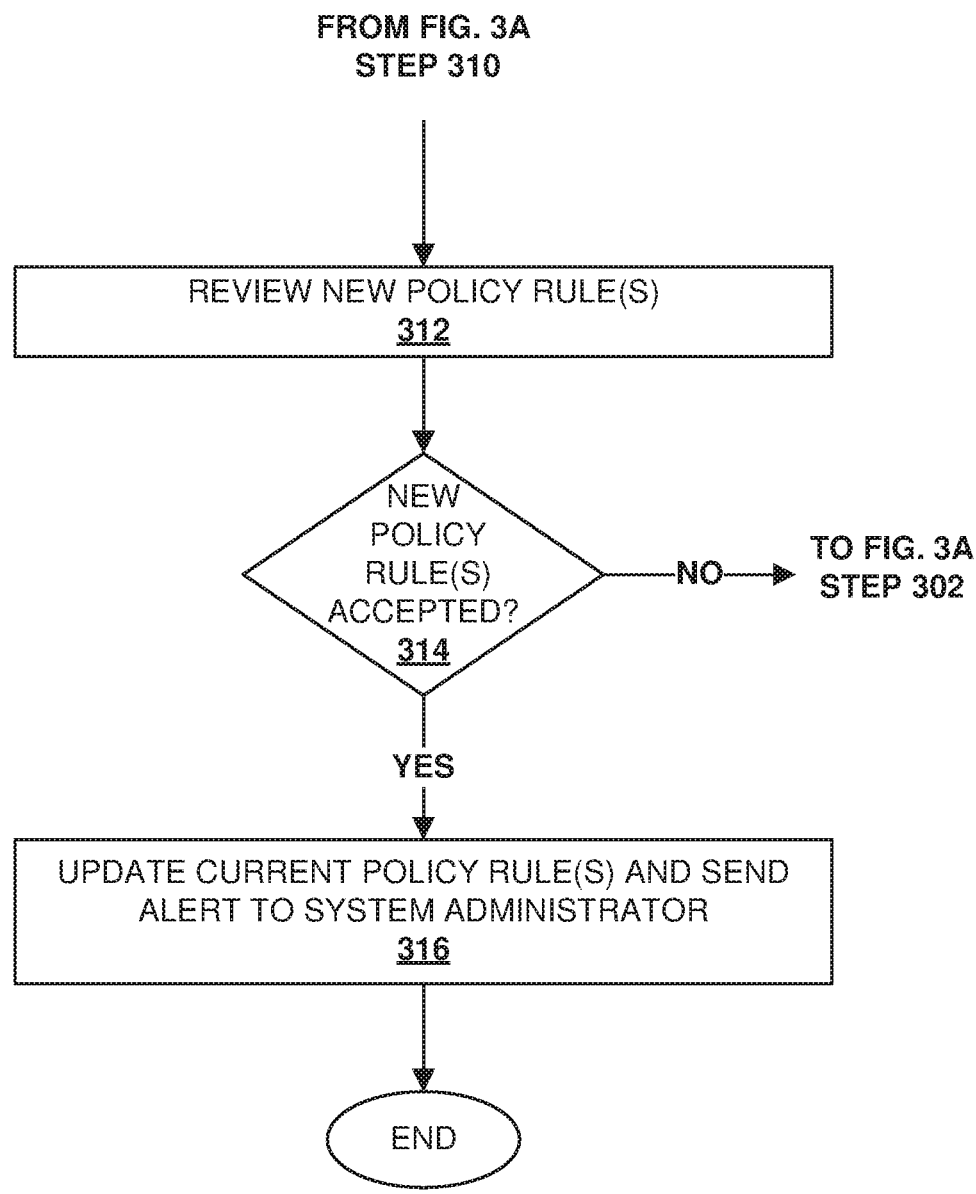

Referring now to FIGS. 3A-3B, a flowchart 300 illustrating a method for cognitive backup of computer data is shown, according to an embodiment of the present disclosure. The process starts at step 302 where frequently accessed files are identified based on a workload behavior. Specifically, at step 302, automated health check procedures can be executed by the cognitive backup system of FIG. 2 to determine, based on the workload behavior, data associated with frequently accessed (or important) files to be included in behavior-based backup operations. The data associated with frequently accessed files is processed at step 303 to determine relevant insights on the workload behavior, as described above with reference to FIG. 2.

Once frequently accessed files by the workload are identified, machine learning programs can be used to determine (active) backup policy rules fed by manual or automatic tasks (e.g., brokerage/orchestration), iNode and data blocks information. Based on the identified frequently accessed files and the determined backup policy rules, iNode and data blocks information, a list of files to be considered for the behavior-based backup rules is generated at step 304. The list is based on usage and data access statistics obtained from the machine learning programs. The usage and data access statistics may include, for example, a high rate of Input/Output operations per second (IOPS).

Thus, based on usage and data access statistics obtained from multiple sources of data access information, including both machine level data and policy data, a workload behavior can be determined and used to classify the identified data files. The identified frequently accessed files based on workload behavior provides a basis for determining and delivering necessary storage resources for data protection and preservation. Additionally, by analyzing the workload behavior, data access information, and current policy rules using machine learning tools, handling of active data protection can be performed automatically.

In an embodiment, a one-hot encoding can be used to obtain the vectors needed for the machine learning programs (regardless of the type of machine learning programs chosen). The one-hot encoding may rely on rules such as, for example, IOPS>20 in a 24 hours period to identify the files to be considered for behavior-based backup rules.

Additionally, a date created/date accessed can be used as a variable depending on the development, testing, acceptance, and production cycle as criteria for relevance. For example, where date >366 days or access >8 days. Any of the above rules may result in a 0/1 encode for the variable or vector required for the machine learning programs.

In another embodiment, more complex systems can be developed based on integer rather than one-hot encoding. For example, an application can be denoted via an integer-based analysis (e.g., Bob's application=1, Gavin's application=2) and then the machine learning algorithm may then be policy-based as it is derived via the application and not from rule sets.

In yet another embodiment, pattern recognition can be implemented as part of the machine learning techniques for datasets which are regularly modified. For example, a batch process that happens once a month can be a pattern that is identified through machine learning that influences the backup method.

At step 306, the generated file list is compared to the policy rules currently active in the system to find mismatches or discrepancies between the generated file list and the determined current policy rules. The terms "mismatch" and "discrepancy" generally refer to one or more differences between current backup policy rules and the generated file list including frequently accessed files by the workload. The term "gap" may also be used to refer to the difference(s) between the current backup policy rules and the generated file list including frequently accessed files by the workload. By finding or uncovering such discrepancies between the current backup policy rules and the generated file list, new policy rules based on the workload behavior can be generated to avoid data loss, particularly, the loss of data associated with frequently accessed files by the workload.

At step 308, in response to not identifying any mismatch between active backup policy rules and the generated file list, the process ends.

In response to identifying at least one mismatch between the active backup policy rules and the generated file list at step 308, the process continues at step 310 where for each identified mismatch or gap, at least one new behavior-based policy rule is defined and recommended for implementation. It should be noted that the learning capabilities of the proposed system may have an influence on the newly defined behavior-based policy rules. Further, at step 310, an alert is generated and sent to a system administrator to inform about the new behavior-based policy rule. In an embodiment, the alert received by the system administrator includes details regarding compliance issues. In some embodiments, the alert can be received via existing collaboration channels such as, for example, text messaging services, Slack®, and the like.

According to an embodiment, the alert message prompts the system administrator to review the proposed behavior-based policy rule(s). At step 312, the behavior-based policy rule(s) are reviewed by the system administrator and a decision is made at step 314 regarding accepting or rejecting the proposed behavior-based policy rules. Based on the behavior-based policy rule not being accepted by the system administrator, the process returns to step 302.

At step 316, in response to the system administrator accepting the proposed behavior-based policy rule(s), active or current policy rules (i.e., policy-based management system rules) are updated and replaced by the proposed behavior-based policy rules. According to an embodiment, the active policy rules are logged with (detailed) comments regarding the transaction for audit purposes. Additionally, exceptions to the proposed behavior-based policy rules can be logged with a justification from the system administrator. After updating the active policy rule(s), a message is sent to notify the system administrator of the changes that have been performed. In some cases, the message may contain information regarding failures in the implementation of the proposed behavior-based policy rules, if applicable. At this point, the process may return to step 302 where a new health check cycle starts.

The proposed method and associated system for cognitive data backup combines cognitive data management with current machine learning techniques to determine active data in the environment and automates the data retention with a backup/archive functionality. Metadata from block storage management tools (i.e., IOPS), file storage (i.e., access metadata), application logs (i.e., database logging), and operating file system data can be captured to a central repository. Then, data analytics is used to determine the dataset to be retained and inform a machine learning automaton to act according to that information by pulling a copy of the data with a backup/archive functionality. The behavior-based policies can be utilized throughout the computation space and can be storage-independent (e.g., source can be a container, IoT device, etc.).

Thus, according to an embodiment, the proposed method and associated system utilize a cognitive behavior-based data management approach to backup and archiving data. Multiple points of access information are used to determine data behavior (block storage access, file system access, application log access, etc.). The behavior of the data provides the basis for classifying it and delivering the necessary storage resources, as well as determining appropriate services for data protection and preservation (backup/archive). Machine learning tools are used in the proposed embodiments to analyze the multiple data access sources and take the required action, hence automating the handling of active data protection. In some embodiments, the proposed system can also utilize policy-based rules as well as becoming a secondary control mechanism to avoid any misses during data backup.

For instance, DEV files are frequently converted into a PROD file without updating the manual policy definition of the file. Thus, data is automatically backed up based on access/utilization rather than policy. By doing this, potential process misses, or human error(s) can be avoided.

Therefore, embodiments of the present disclosure provide a method, computer system, and computer program product to backup data files identified as important by the nature of usage behavior. As such, traditional backup processes can be enhanced with a secondary control to avoid backup retention being missed, thereby reducing data loss and improving backup success rates which may help achieving contractual Service Level Agreements (SLA) with customers.

Figure 4:
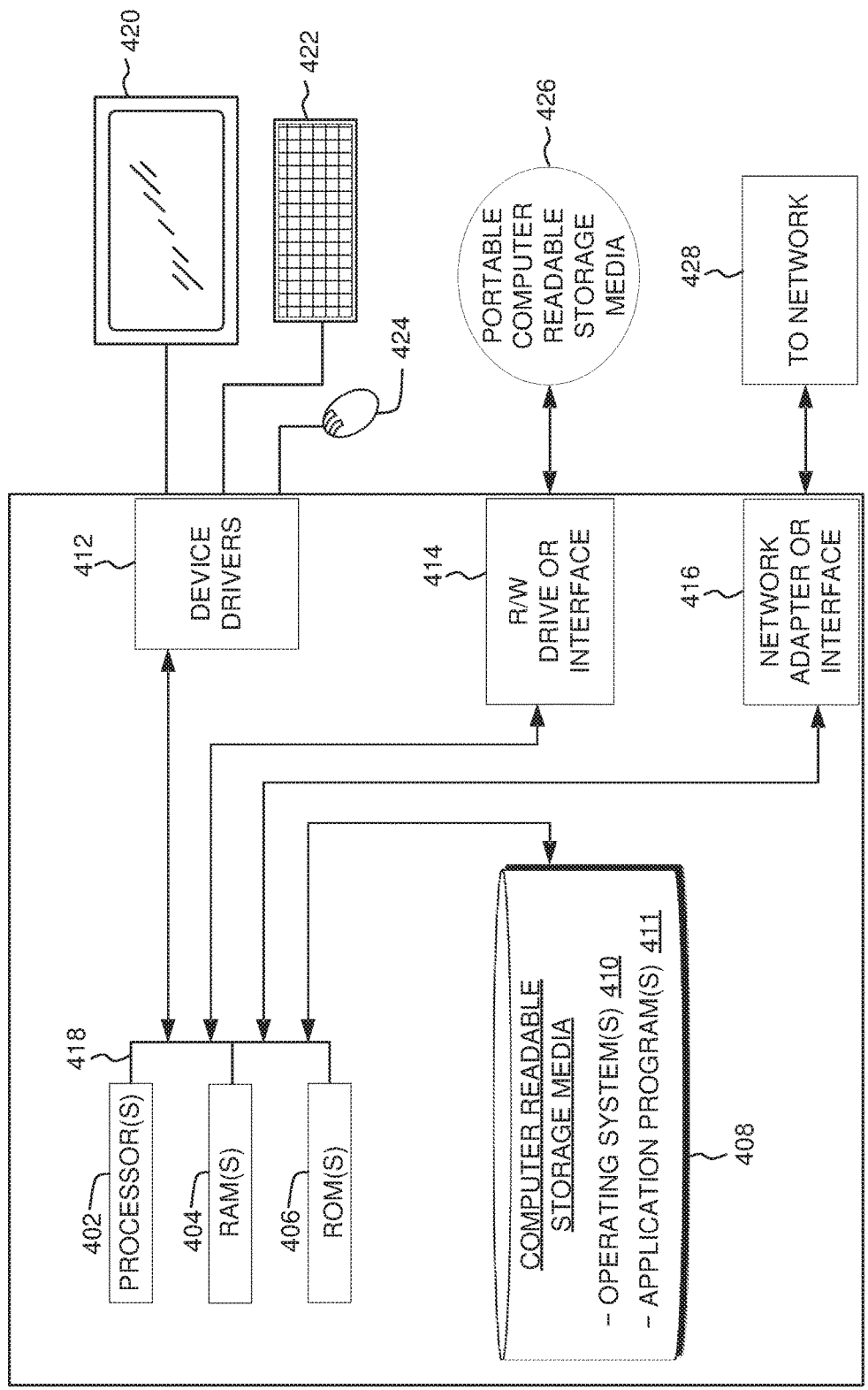
FIG. 4 is a block diagram of internal and external components of a computer system, according to an embodiment of the present disclosure.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
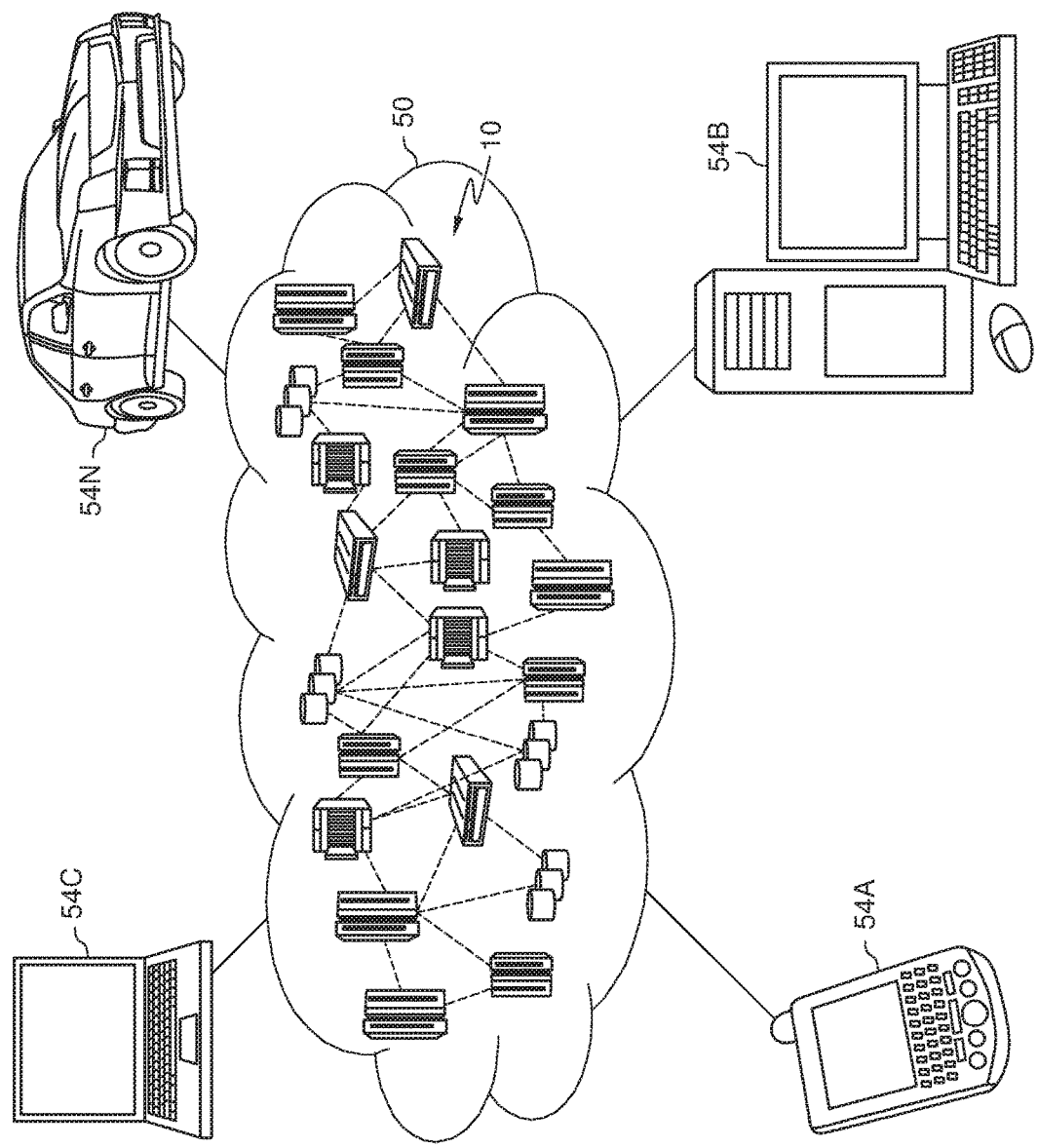
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
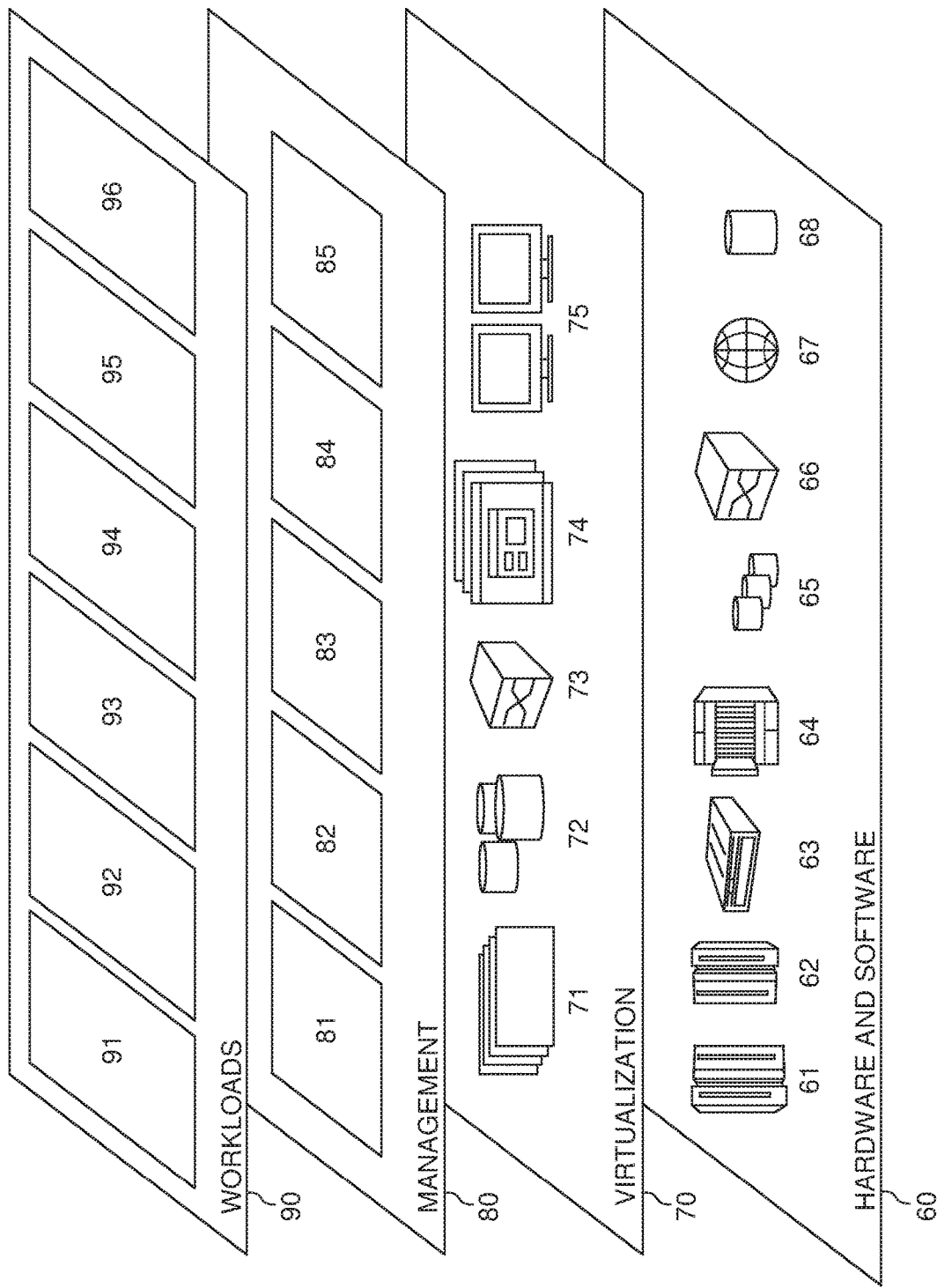
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive data backup 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data backup based on a workload behavior, comprising:
    identifying by a first computer, using machine learning tools, data associated with frequently accessed files on the first computer by a workload being processed by a second computer;
    processing, by the first computer, the identified data associated with the frequently accessed files to generate a list of frequently accessed files by the workload;
    creating, by the first computer, a timestamp for each of the frequently accessed files in the list of frequently accessed files, the timestamp comprising a time at which a file was last modified, a file creation time, a time the file was last accessed, a time file metadata was changed, or a time the file was last backed up, wherein the timestamp allows the list of frequently accessed files to be compared with backup policy rules active on the first computer,
    comparing, by the first computer, the list of frequently accessed files to the backup policy rules;
    based on the comparison, identifying, by the first computer, a mismatch between the list of frequently accessed files and the backup policy rules; and
    for each identified mismatch between the list of frequently accessed files and the backup policy rules, specifying, by the first computer, a new backup rule to update the backup policy rules.

2. The method of claim 1, further comprising:
    sending, by the first computer, a first message comprising information regarding the new backup rule.

3. The method of claim 1, further comprising:
    based on the new backup rule being accepted, updating, by the first computer, the policy rules with the new backup rule.

4. The method of claim 3, further comprising:
    sending, by the first computer, a second message comprising information regarding the updating of the policy rules with the new backup rule.

5. The method of claim 1, further comprising:
    determining, by the first computer, using machine learning tools, the backup policy rules, iNode and data blocks information.

6. The method of claim 1, further comprising:
    determining, by the first computer, the workload behavior based on data access statistics associated to an access of the workload to system files; and
    collecting, by the first computer, the data access statistics using a first database management tool.

7. The method of claim 6, wherein the data access statistics comprises a high rate of Input/Output operations per second (IOPS).

8. The method of claim 1, further comprising:
    capturing, by the first computer, data associated with each of the timestamped frequently accessed files to a second database management tool.

9. The method of claim 1, further comprising:
    automatically capturing, by the first computer, data associated with a type, a content, or a time of transactions made locally to a database log file of an IoT device, the automatically captured data comprising event logs or syslog associated with an activity on the IoT device.

10. A computer system for data backup based on a workload behavior, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
identifying by a first computer, using machine learning tools, data associated with frequently accessed files on the first computer by a workload being processed by a second computer;
processing, by the first computer, the identified data associated with the frequently accessed files to generate a list of frequently accessed files by the workload;
creating, by the first computer, a timestamp for each of the frequently accessed files in the list of frequently accessed files, the timestamp comprising a time at which a file was last modified, a file creation time, a time the file was last accessed, a time file metadata was changed, or a time the file was last backed up, wherein the timestamp allows the list of frequently accessed files to be compared with backup policy rules active on the first computer;
comparing, by the first computer, the list of frequently accessed files to the backup policy;
based on the comparison, identifying, by the first computer, a mismatch between the list of frequently accessed files and the backup policy rules; and
for each identified mismatch between the list of frequently accessed files and the backup policy rules, specifying, by the first computer, a new backup rule to update the backup policy rules.

11. The computer system of claim 10, further comprising:
sending, by the first computer, a first message comprising information regarding the new backup rule.

12. The computer system of claim 10, further comprising:
based on the new backup rule being accepted, updating, by the first computer, the policy rules with the new backup rule.

13. The computer system of claim 12, further comprising:
sending, by the first computer, a second message comprising information regarding the updating of the policy rules with the new backup rule.

14. The computer system of claim 10, further comprising:
determining, by the first computer, using machine learning tools, the backup policy rules, iNode and data blocks information.

15. The computer system of claim 10, further comprising:
determining, by the first computer, the workload behavior based on data access statistics associated to an access of the workload to system files; and
collecting, by the first computer, the data access statistics using a first database management tool.

16. The computer system of claim 15, wherein the data access statistics comprises a high rate of Input/Output operations per second (IOPS).

17. The computer system of claim 10, further comprising:
capturing, by the first computer, data associated with each of the timestamped frequently accessed files to a second database management tool.

18. The computer system of claim 10, further comprising:
automatically capturing, by the first computer, data associated with a type, a content, or a time of transactions made locally to a database log file of an IoT device, the automatically captured data comprising event logs or syslog associated with an activity on the IoT device.

* * * * *